United States Patent
Lapstun et al.

(10) Patent No.: US 6,724,374 B1
(45) Date of Patent: Apr. 20, 2004

(54) SENSING DEVICE FOR CODED ELECTRONIC INK SURFACE

(75) Inventors: Paul Lapstun, Rodd Point (AU); Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 114 days.

(21) Appl. No.: 09/693,473

(22) Filed: Oct. 20, 2000

(30) Foreign Application Priority Data

Oct. 25, 1999 (AU) ............................................. PQ3632

(51) Int. Cl.[7] ................................................ G09G 5/00
(52) U.S. Cl. ........................ 345/179; 345/173; 345/177
(58) Field of Search ................................ 345/5, 13, 23, 345/158, 173, 177, 179; 178/18.01–18.09; 342/558; 382/219, 315; 401/45, 495; 360/74.6

(56) References Cited

U.S. PATENT DOCUMENTS

| | | | | |
|---|---|---|---|---|
| 4,380,032 A | * | 4/1983 | Pfost | .......................... 360/74.6 |
| 5,051,736 A | | 9/1991 | Bennett et al. | |
| 5,477,012 A | | 12/1995 | Sekendur | |
| 5,561,446 A | * | 10/1996 | Montlick | .................... 345/173 |
| 5,652,412 A | | 7/1997 | Lazzouni | |
| 5,661,506 A | | 8/1997 | Lazzouni | |
| 5,692,073 A | | 11/1997 | Cass | |
| 5,852,434 A | * | 12/1998 | Sekendur | .................. 178/18.01 |
| 6,076,734 A | | 6/2000 | Dougherty et al. | |
| 6,130,666 A | * | 10/2000 | Persidsky | ................ 178/19.01 |
| 6,181,329 B1 | * | 1/2001 | Stork et al. | ............... 178/19.01 |
| 6,335,727 B1 | * | 1/2002 | Morishita et al. | ........ 178/18.03 |
| 6,376,828 B1 | * | 4/2002 | Comiskey | .................... 250/216 |
| 6,396,481 B1 | * | 5/2002 | Challa et al. | ............. 178/18.01 |
| 6,454,482 B1 | * | 9/2002 | Silverbrook et al. | ......... 401/195 |
| 6,474,888 B1 | * | 11/2002 | Lapstun et al. | ................ 401/45 |

FOREIGN PATENT DOCUMENTS

| | | |
|---|---|---|
| GB | 2306669 | 5/1997 |
| WO | WO 98/03896 | 1/1998 |
| WO | WO 99/18487 | 4/1999 |
| WO | WO 99/50787 | 10/1999 |

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392–406.

* cited by examiner

Primary Examiner—Bipin Shalwala
Assistant Examiner—Prabodh M. Dharia

(57) ABSTRACT

A sensing device for use with a surface having coded data and electronic ink disposed on the surface, the coded data being indicative of an identity of a region associated with the surface, the sensing device including: a region identity generator configured to generate region identity data indicative of the identity of the region using the coded data; and a transmitter configured to transmit the region identity data to a computer system.

40 Claims, 14 Drawing Sheets

SENSING DEVICE FOR CODED ELECTRONIC INK SURFACE

CO-PENDING APPLICATIONS

Various methods, systems and apparatus relating to the present invention are disclosed in the following co-pending applications filed by the applicant or assignee of the present invention simultaneously with the present invention:

| | | |
|---|---|---|
| 09/693,415 | 09/693,219 | 09/693,280 |
| 09/693,515 | 09/693,705 | 09/693,647 |
| 09/693,690 | 09/693,593 | 09/693,216 |
| 09/693,341 | 09/696,473 | 09/696,514 |
| 09/693,301 | 09/693,388 | 09/693,704 |
| 09/693,510 | 09/693,336 | 09/693,335 |

The disclosures of these co-pending applications are incorporated herein by reference.

Various methods, systems and apparatus relating to the present invention are disclosed in the following co-pending applications filed by the applicant or assignee of the present invention on Sep. 15, 2000: Ser. Nos. 09/663,579, 09/669,599, 09/663,701, 09/663,640.

The disclosures of these co-pending applications are incorporated herein by reference.

Various methods, systems and apparatus relating to the present invention are disclosed in the following co-pending applications filed by the applicant or assignee of the present invention on Jun. 30, 2000:

| | | |
|---|---|---|
| 09/609,139 | 09/608,970 | 09/609,039 |
| 09/607,852 | 09/607,656 | 09/609,132 |
| 09/609,303 | 09/610,095 | 09/609,596 |
| 09/607,843 | 09/607,605 | 09/608,178 |
| 09/609,553 | 09/609,233 | 09/609,149 |
| 09/608,022 | 09/609,232 | 09/607,844 |
| 09/607,657 | 09/608,920 | 09/607,985 |
| 09/607,990 | 09/607,196 | 09/606,999 |

The disclosures of these co-pending applications are incorporated herein by reference.

Various methods, systems and apparatus relating to the present invention are disclosed in the following co-pending applications filed by the applicant or assignee of the present invention on May 23, 2000:

| | | |
|---|---|---|
| 09/575,197 | 09/575,195 | 09/575,159 |
| 09/575,132 | 09/575,123 | 09/575,148 |
| 09/575,130 | 09/575,165 | 09/575,153 |
| 09/575,118 | 09/575,131 | 09/575,116 |
| 09/575,144 | 09/575,139 | 09/575,186 |
| 09/575,185 | 09/575,191 | 09/575,145 |
| 09/575,192 | 09/575,181 | 09/575,193 |
| 09/575,156 | 09/575,183 | 09/575,160 |
| 09/575,150 | 09/575,169 | 09/575,184 |
| 09/575,128 | 09/575,180, | 09/575,149 |
| 09/575,179 | 09/575,133 | 09/575,143 |
| 09/575,187, | 09/575,155 | 09/575,196 |
| 09/575,198 | 09/575178 | 09/575,164 |
| 09/575,146 | 09/575,174 | 09/575,163 |
| 09/575,168 | 09/575,154 | 09/575,129 |
| 09/575,124 | 09/575,188 | 09/575,189 |
| 09/575,162 | 09/575,172, | 09/575,170 |
| 09/575,171 | 09/575,161, | 09/575,141 |
| 09/575,125 | 09/575,142 | 09/575,140 |
| 09/575,190 | 09/575,138 | 09/575,126 |
| 09/575,127 | 09/575,158 | 09/575,117 |
| 09/575,147 | 09/575,152 | 09/575,176 |
| 09/575,115 | 09/575,114 | 09/575,113 |
| 09/575112 | 09/575,111 | 09/575,108 |
| 09/575,109 | 09/575,110 | 09/575,182 |
| 09/575,193 | 09/575,194 | 6,238,043 |
| 09/575,119 | 09/575,135 | 09/575,157 |
| 09/575,166 | 09/575,134 | 09/575,121 |
| 09/575,137 | 09/575,167 | 09/575,120 |
| 09/575,122 | | |

The disclosures of these co-pending applications are incorporated herein by reference.

FIELD OF INVENTION

The present invention relates generally to a sensing device for capturing interactions with and movement relative to a surface, and more particularly, such interactions with and movement relative to an electronic ink surface.

BACKGROUND

Pen-like devices have been described which mark a surface while simultaneously capturing their own movement relative to the surface. Some such devices sense their own movement using embedded accelerometers. Others sense their own movement by detecting information which is machine-readable encoded on the surface. In this latter category, see for example U.S. Pat. No. 5,477,012, U.S. Pat. No. 5,652,412 and PCT application WO99/50787.

Since these pen-like devices typically utilize conventional marking means such as inking nibs, the surface media being marked are not generally re-usable.

SUMMARY OF INVENTION

In accordance with one aspect of the present invention, there is provided a sensing device for use with a surface having coded data and electronic ink disposed on the surface, the coded data being indicative of an identity of a region associated with the surface, the sensing device including:

a region identity generator configured to generate region identity data indicative of the identity of the region using the coded data; and a transmitter configured to transmit the region identity data to a computer system.

Preferably, the sensing device further includes motion sensing means configured to generate movement data indicative of movement of the sensing device relative to the region. The motion sensing means is preferably configured to generate the movement data using at least some of the coded data.

The coded data is preferably indicative of a plurality of reference points of the region, the motion sensing means being configured to generate the movement data as the sensing device moves relative to at least one of the reference points. The coded data may include periodic elements, the motion sensing means being configured to generate the movement data as the sensing device moves relative to at least one of the periodic elements.

Preferably, the motion sensing means is configured to sample the position of the sensing device relative to the at least one reference point, thereby to generate the movement data. Alternatively, or in addition, the motion sensing means is configured to sample the position of the sensing device relative to the at least one periodic element, thereby to generate the movement data.

Preferably, the motion sensing means includes at least one acceleration sensing means, the acceleration sensing means being configured to sense acceleration of the sensing device as the sensing device moves relative to the region, the motion sensing means being configured to generate the movement data by periodically sampling the acceleration. The acceleration sensing means may be configured to sense at least two substantially orthogonal components of acceleration.

The coded data can be recorded on the surface separately or when the surface is being manufactured. The surface may be any surface including paper, plastics or any other solid material. The surface may be part of another item. For example, it could be part of furniture, part of a wall, part of any object. Preferably, the surface is a page, preferably a page of paper, and may be part of a document.

The sensing device need not actually be in contact with the surface. It may be in contact with the surface, but it may also remain out of contact with the surface and merely pass over the surface.

Information on the position over the surface of the apparatus is preferably transmitted by a transmitter to a computer system, where it can be interpreted. If a person is making a drawing on a sheet of paper on which the coded data is recorded, therefore, the computer system can interpret the positional information provided by the device so that data indicative of the drawing can be stored in the computer and reproduced as, for example, a printed page. Alternatively, the positional information may be used to control the computer system. The preferred embodiment which utilizes the sensing device in conjunction with a computer system will be described later.

Preferably, the device further includes a state changing device for changing the state of the electronic ink. In this way the surface can be visibly marked or previously applied marks can be erased by changing the state of the electronic ink as, the device moves relative to the surface.

Preferably, the state changing device is activatable and deactivatable.

The device preferably further includes a force sensor adapted to activate or deactivate the state changing device when the force between the device and the surface exceeds a predetermined value.

Preferably, the device further includes means responsive to a marker associated with the surface to enable or disable the state changing device in response to detection of the marker.

Preferably, the state changing device includes an electric field generator.

Preferably, the state changing device includes a first state changing device for changing the state of the electronic ink to a first state, and a second state changing device for changing the state of the electronic ink to a second state.

Preferably, the device is elongate, the first state changing device is disposed adjacent a first longitudinal end of the sensing device and the second state changing device is disposed adjacent a second opposite longitudinal end of the sensing device.

Preferably, the coded data includes a plurality of tags, each tag being indicative of an identity of a region within which the tag lies, and each tag being indicative of a reference point of the region, the region being associated with the surface, and the reference point being indicative of the position of the tag relative to the region. Alternatively, or in addition, each tag is indicative of an identity of a region within which the tag lies, and each tag includes at least one periodic element.

In accordance with an alternative aspect of the present invention, there is provided a system for capturing information applied freehand, the system including a sensing device in accordance with the first aspect of the present invention and a substrate including a surface having electronic ink associated with the surface and coded data associated with the surface.

Preferably, the surface is provided with electronic ink and color visible ink which is not electronic ink. The substrate is preferably paper.

A region may include a plurality of tags. A region may be, for example, a single, page or a specific area on a surface. Preferably, each of the tags in a region is indicative of region data which identifies that region. Where the region is a page, therefore, each one of a plurality of tags on that page is indicative of position data identifying the absolute position of the identifier on that page and also region data which identifies the age. Preferably, the detection means of the device is arranged to capture the region data and may be passed on to a computer system. This enables, for example, a computer system to identify a page so that, for example, a computer system 'knows' the exact document which is being written or drawn on.

As discussed above, the device need not be in contact with the surface. Where it is intended to be used at least sometimes in contact with a surface, the device may include a force sensor for sensing the force of the device applied to the surface. Preferably, the device includes a force data producing means for producing force data which provides information on the force. The information can preferably be utilized in at least two ways.

Firstly, it can be used to determine when the device is first applied to the surface and when it leaves the surface, with motion between force application and removal being defined as a 'stroke' in freehand. The force data information can be time stamped.

Secondly, it can be used to detect, on a substantially continuous basis, force variations when the device is applied to the surface. This information may be utilized to characterize a signature of a user, for example, or may be used for a further control for a computing system.

The device is preferably a separate implement containing the appropriate means as discussed above. It may be any shape but it is preferably in the form of a stylus or pen.

The device is preferably intended for interaction with a computer system that can be controlled and can interpret the freehand information (whether drawing or writing) applied by a user via the device. Preferably, the device is arranged to provide device identification information which uniquely identifies the device. The computer system may therefore use this to identify the device.

In accordance with a further alternative aspect of the present invention, there is provided a substrate including a surface having electronic ink associated with the surface and coded data associated with the surface, the coded data being indicative of an identity of a region associated with the surface.

Features and advantages of the present invention will become apparent from the following description of embodiments thereof, by way of example only, with reference to the accompanying drawings.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. No. 09/575,129, U.S. Ser. No. 09/575,174, U.S. Ser. No. 09/575,155, U.S. Ser. No. 09/575,195 and U.S. Pat. No. 6,428,133. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
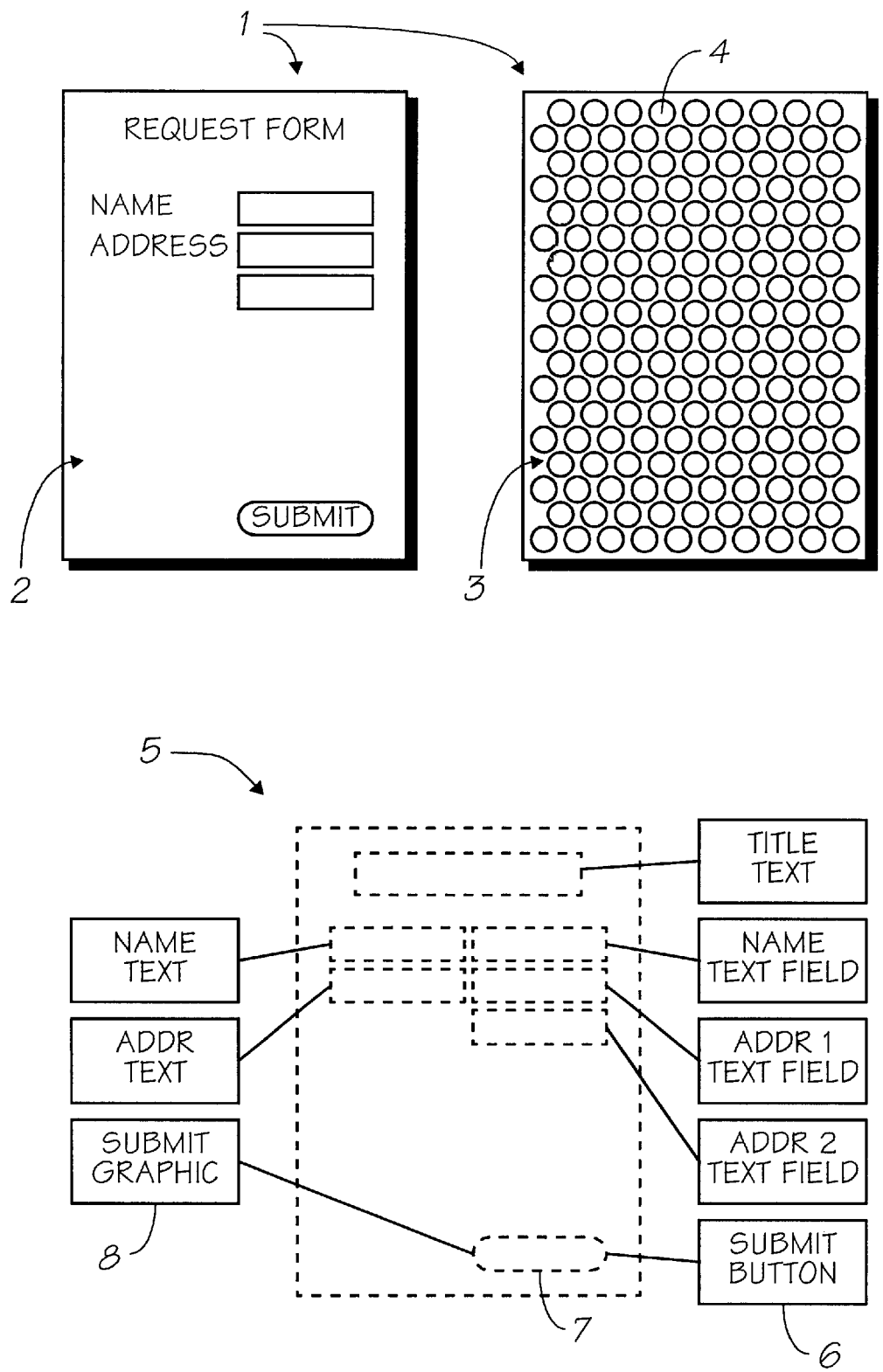
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
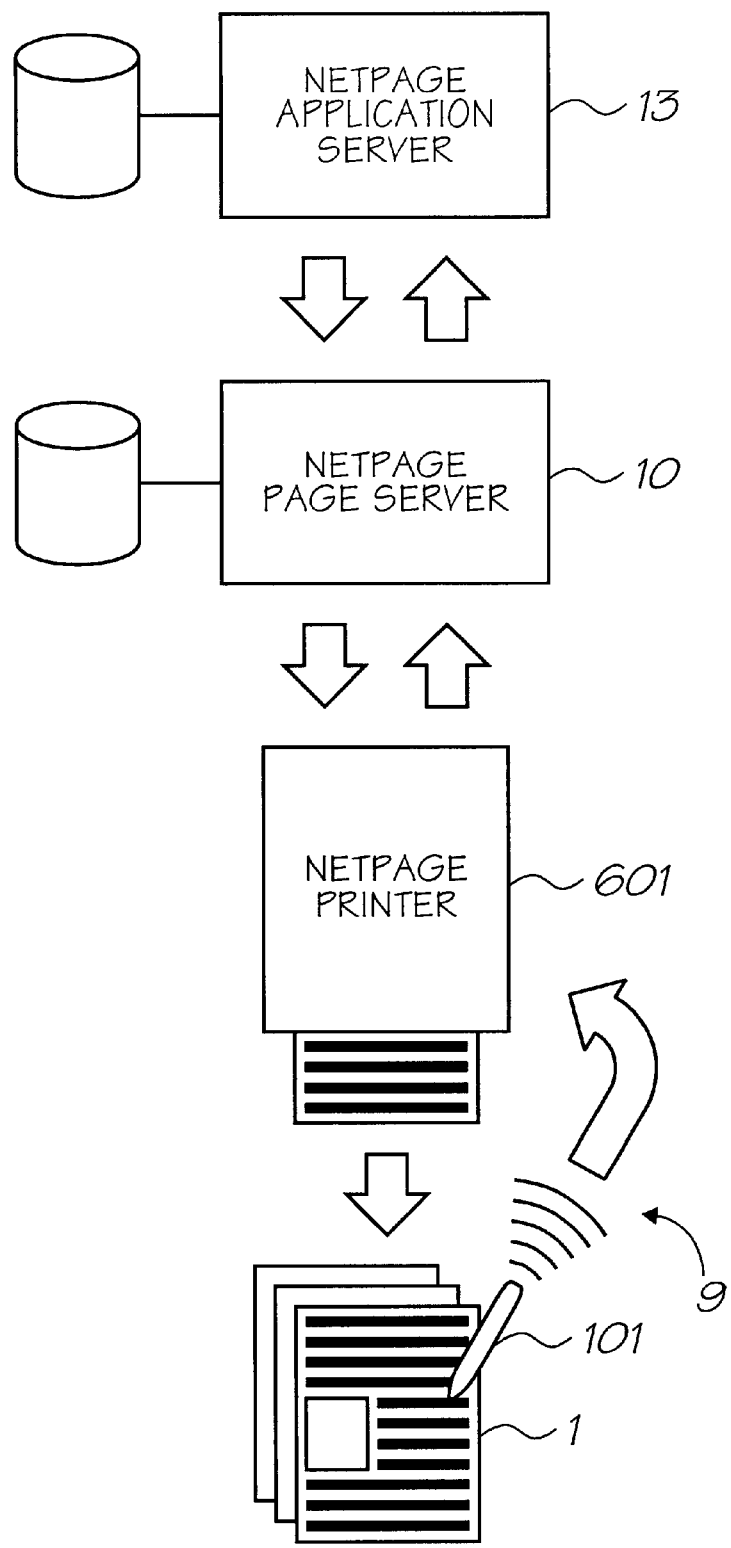
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Ser. No. 09/575,155 and our co-filed application U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system MEMS) based inkjet (Memjet™) printers, for example as described in our earlier U.S. Pat. No. 6,428,133. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
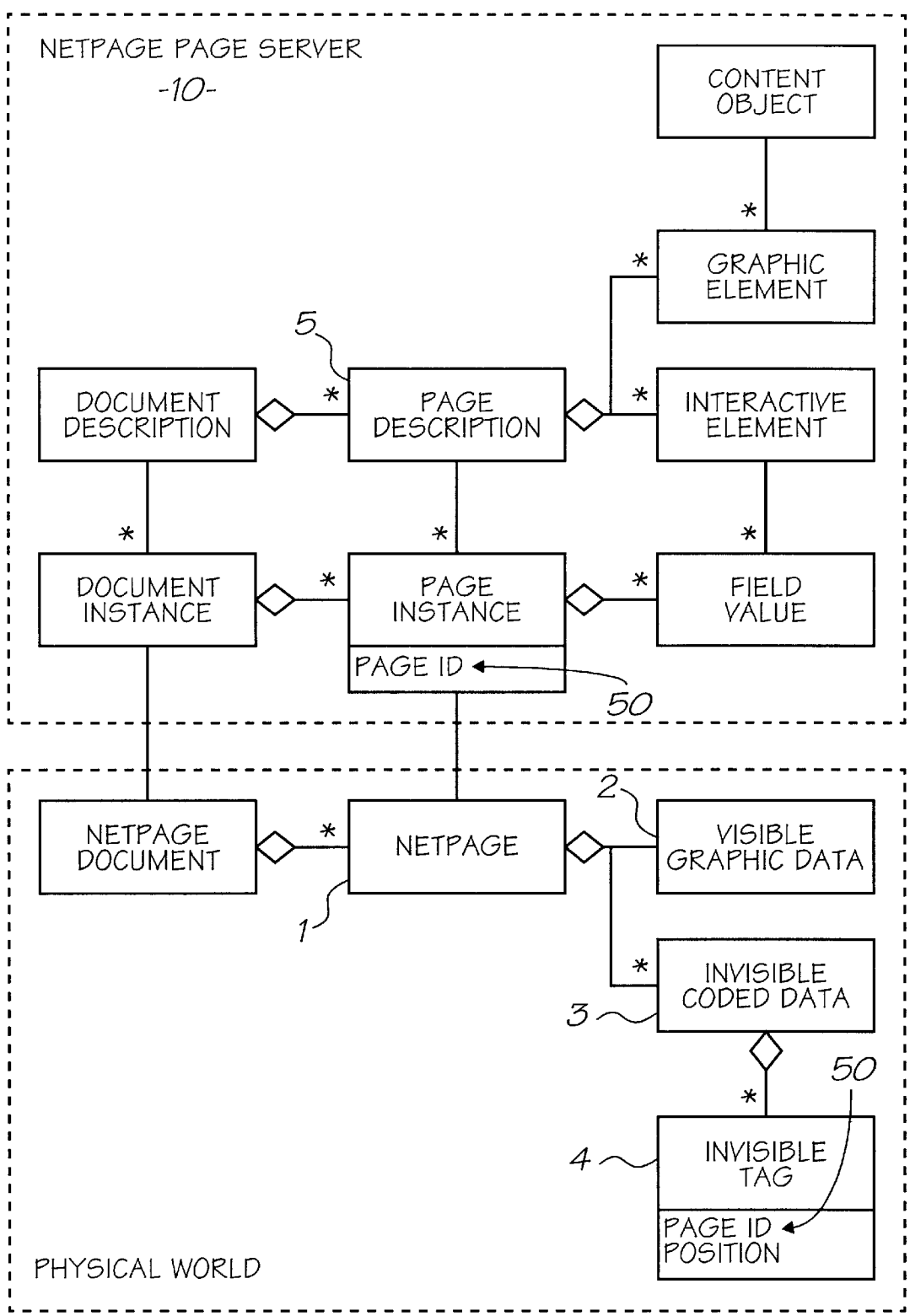
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ ($\sim 10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4–bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
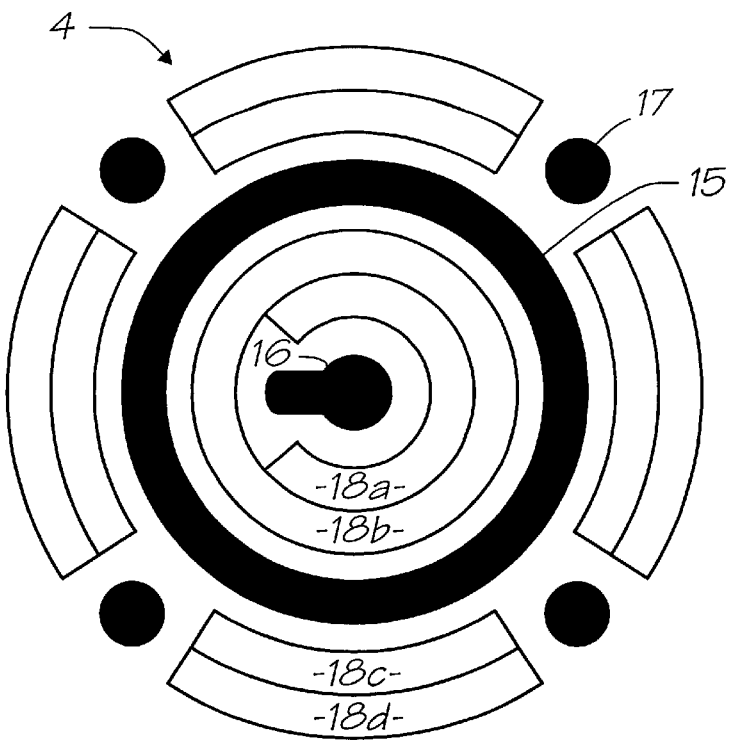
FIG. 4a is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
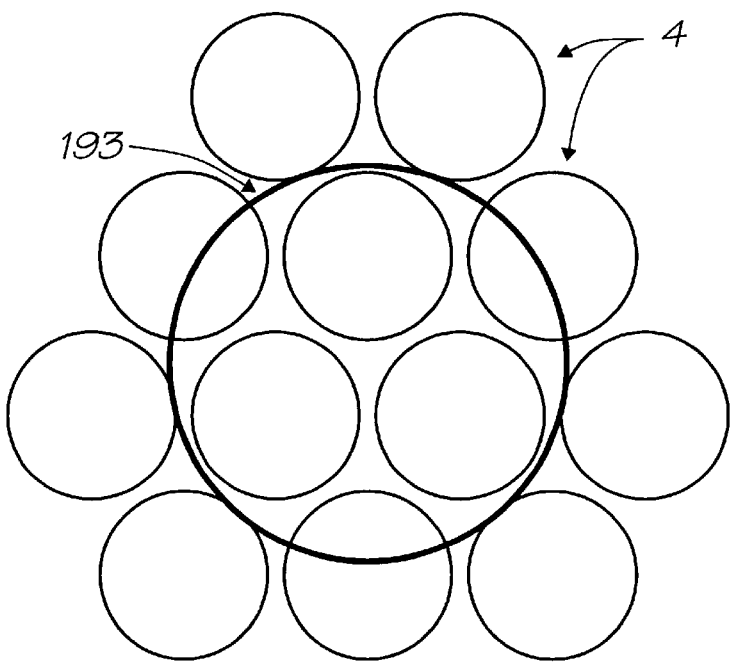
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

Figure 6:
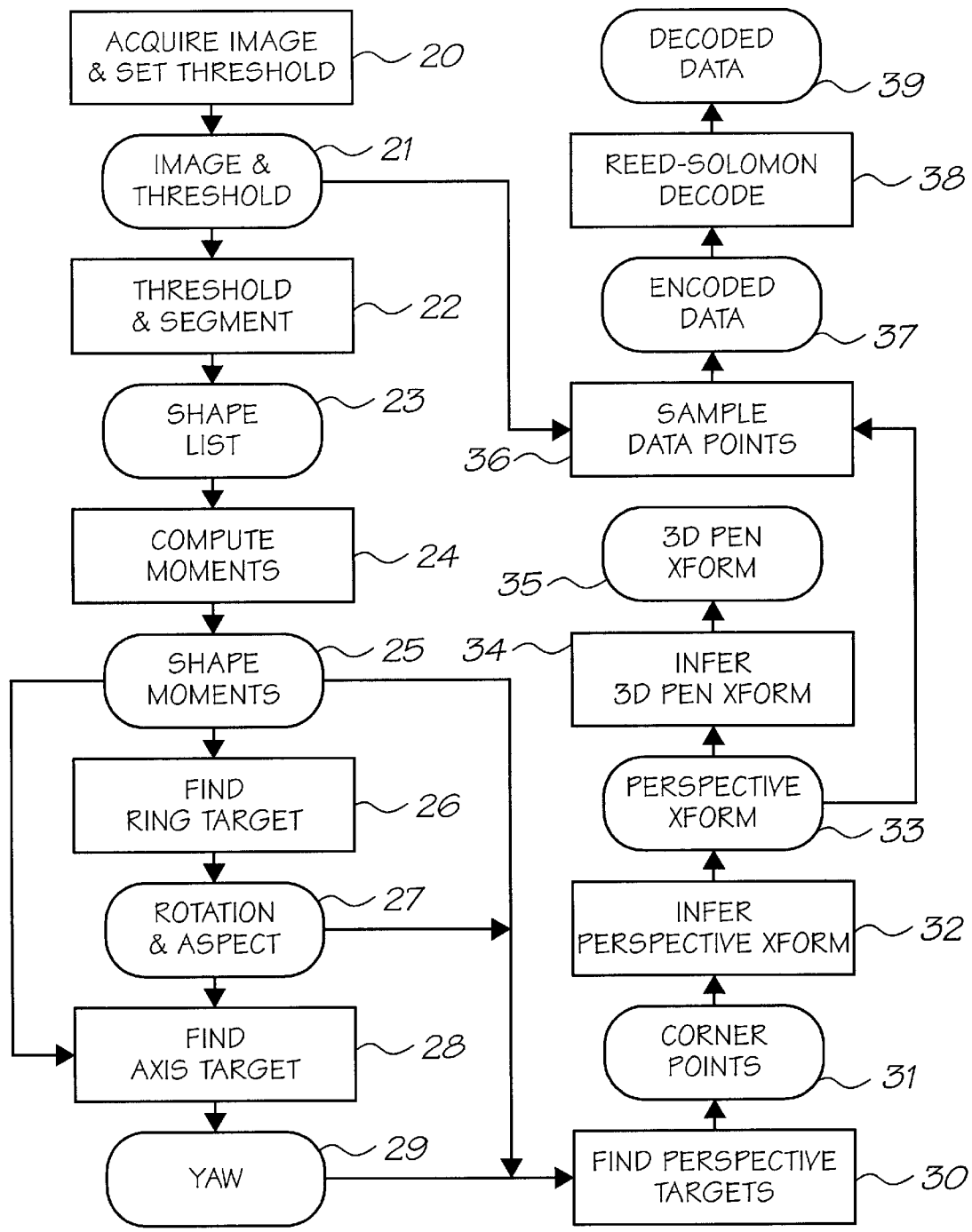
FIG. 6 is a schematic view of a tag image processing and decoding algorithm.
Figure 7:
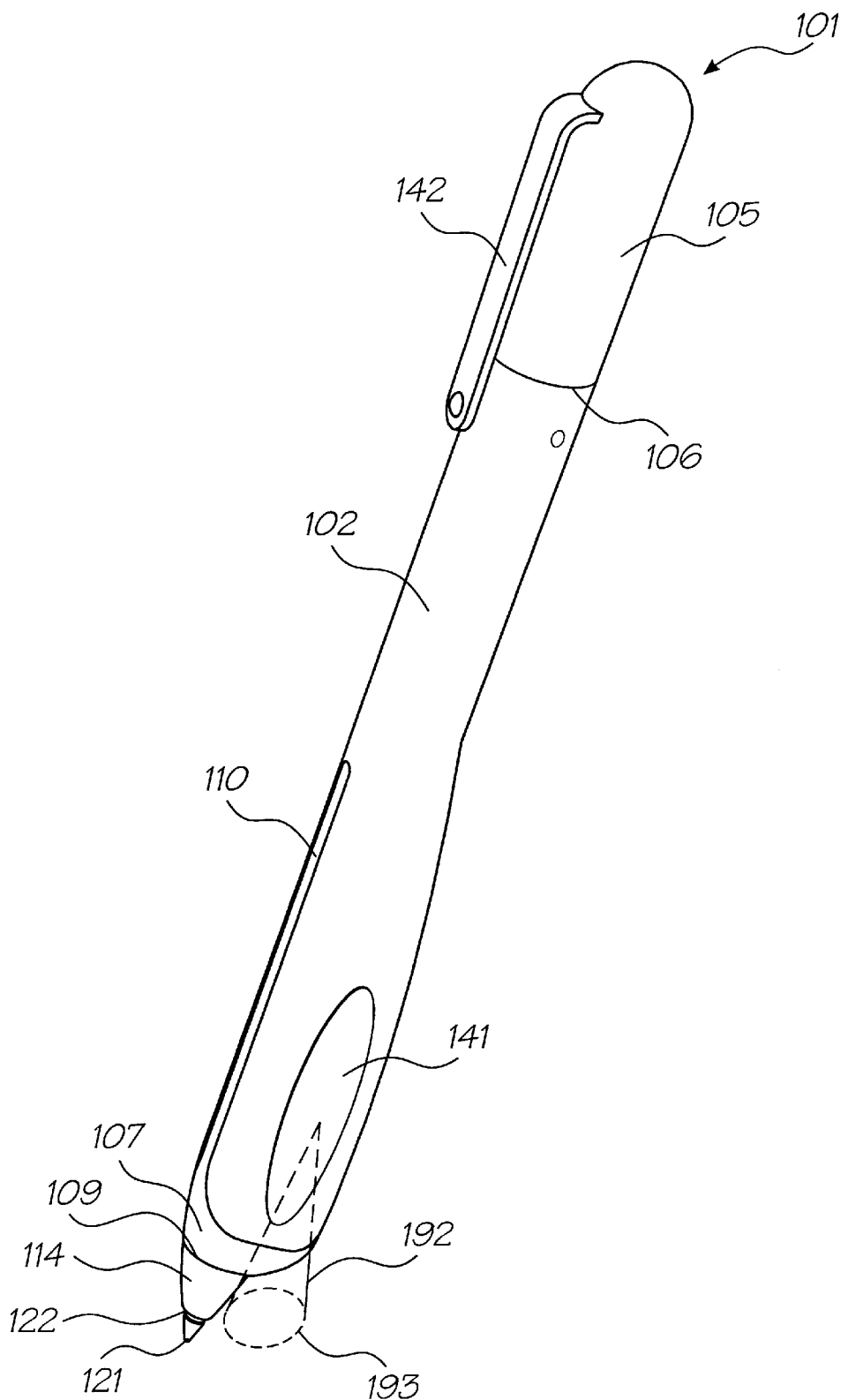
FIG. 7 is a perspective view of a netpage pen and its associated tag-sensing field-of-view cone.
Figure 8:
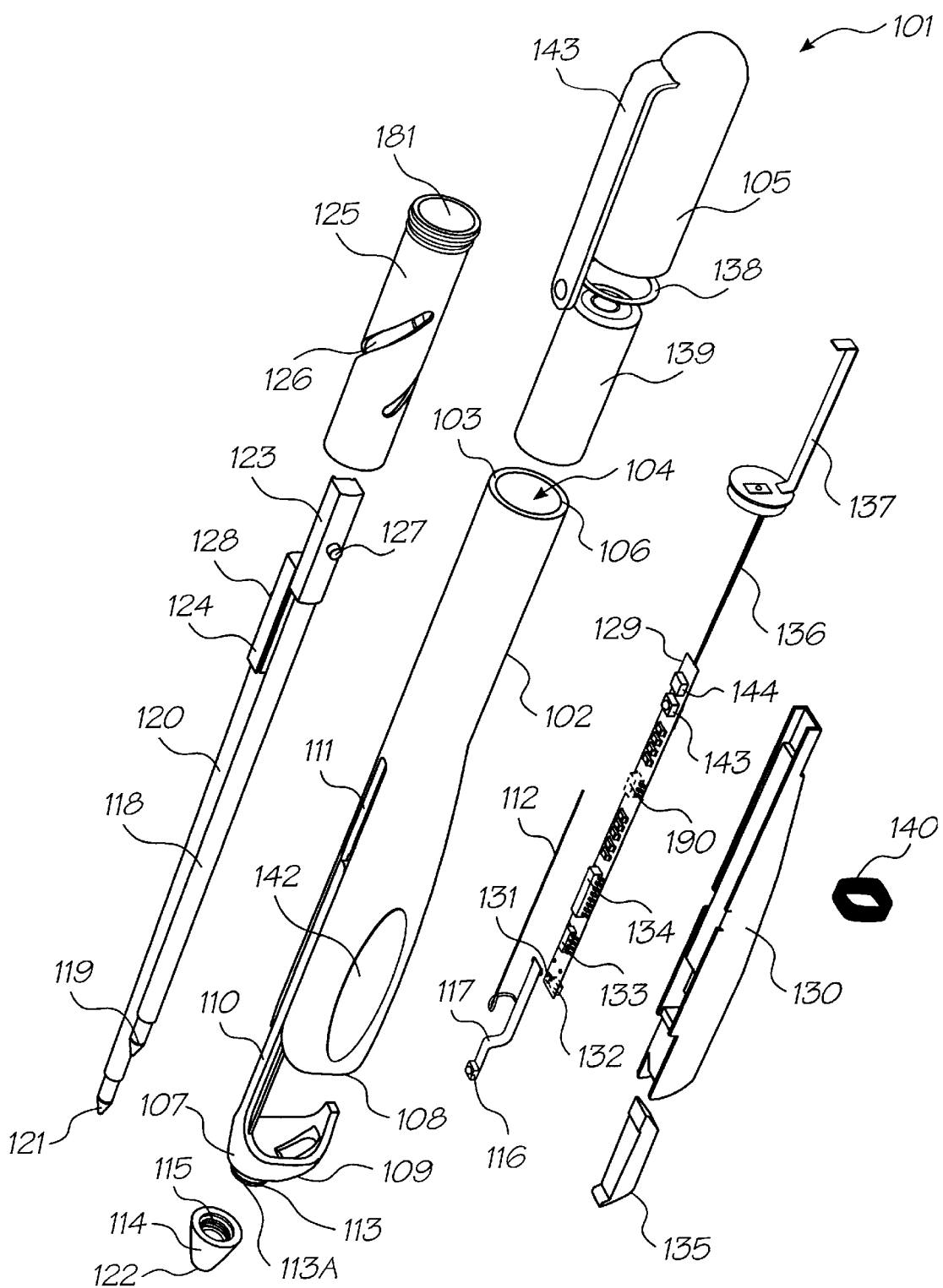
FIG. 8 is a perspective exploded view of the netpage pen shown in FIG. 7.

The tag image processing and decoding performed by a sensing device such as the netpage pen is shown in FIG. 6. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
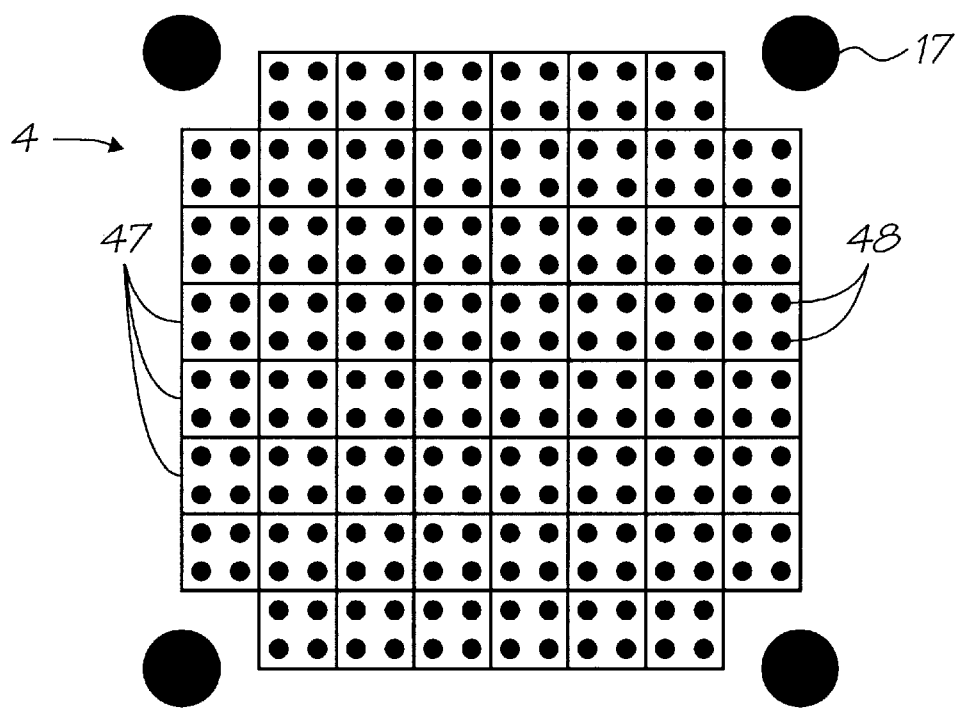
FIG. 5a is a plan view showing an alternative structure of a netpage tag.
Figure 5B:
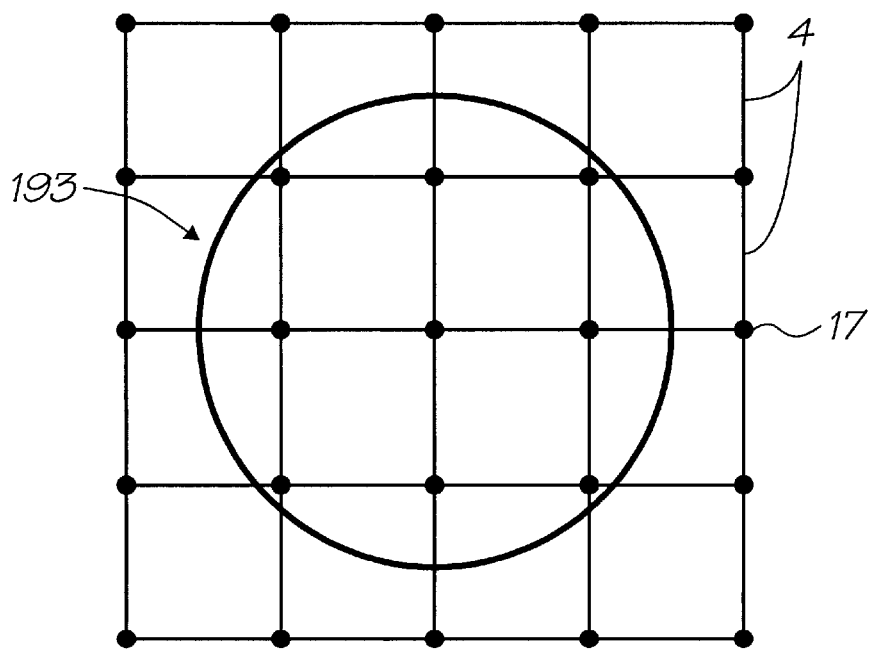
FIG. 5b is a plan view showing a relationship between a set of the tags shown in FIG. 5a and a field of view of a netpage sensing device in the form of a netpage pen.
Figures 5C, 5D:
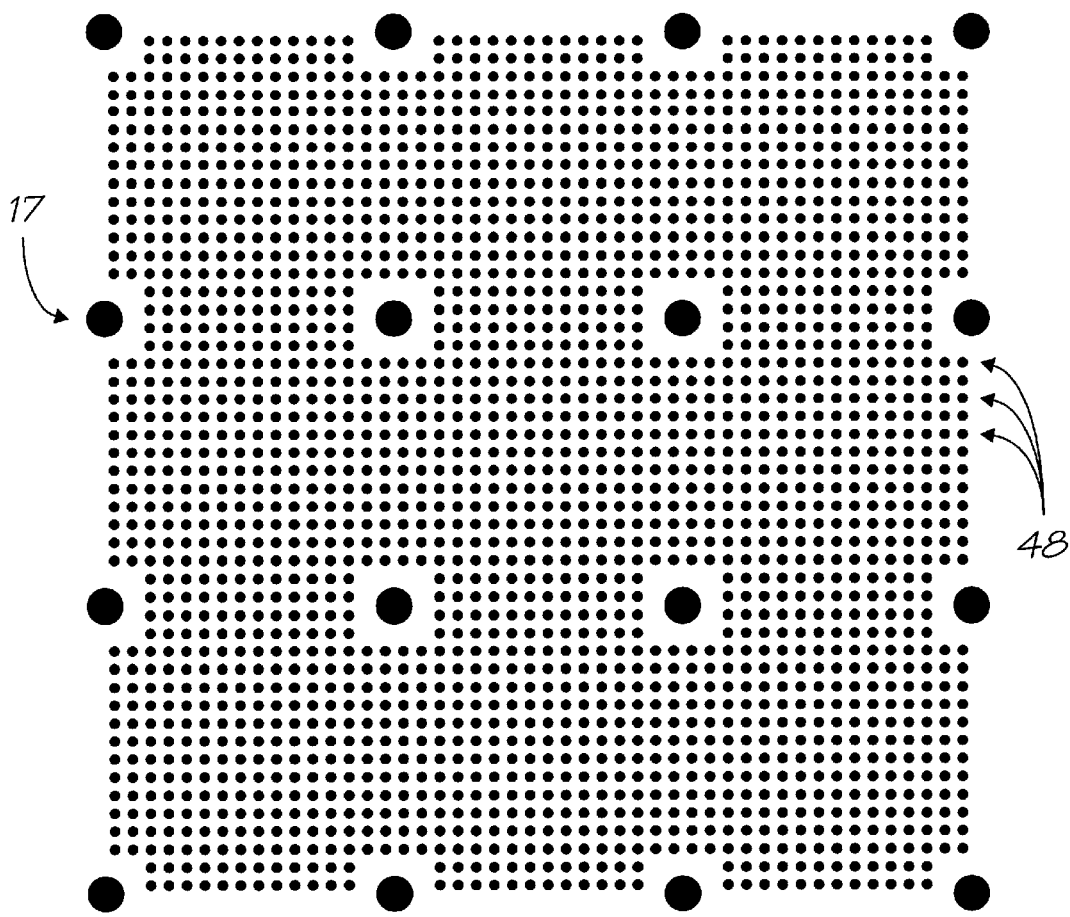

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1–4) and the position of the symbol within the codeword (A–O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575,174.

An embodiment of the present invention, in the form of a pen-like sensing device for coded electronic ink surfaces will now be described. The sensing device is hereinafter simply referred to as a "pen".

Electronic ink typically takes the form of substantially bistable monochrome or colored dots which can be addressed externally to selectively change the state of the dots. The state of an individual dot is typically changed by applying an electric field of appropriate polarity. Although some electronic inks may be printed onto a surface, other electronic inks are essentially manufactured into a substrate, producing something more akin to "electronic paper". Both kinds are considered within the scope of the present invention.

Electronic ink is mutable in two ways: it may be "printed" any number of times by a printer which incorporates appropriate dot-addressing electrodes, and it may be written (and/or erased) by a writing (and/or erasing) implement which incorporates appropriate electrodes.

A coded electronic ink surface is a hybrid which contains both immutable tags, as described above, and mutable electronic ink. It may also contain visible graphic information printed onto the surface by conventional means.

A coded electronic ink surface has the advantage that it can be made interactive, as described earlier, through the use of a sensing device incorporating an appropriate sensor.

The "printing" of coded electronic ink pages, where the visible graphic content of a page may change any number of times while the tags remain unchanged, is described in our co-filed application U.S. Ser. No. 09/693,514.

One form of electronic ink is disclosed in U.S. Pat. No. 4,126,854, the contents of which are incorporated herein by reference. The disclosed electronic ink includes a plurality of spheres, each made both electrostatically and optically anisotropic via surface coatings, and each suspended within its own fluid-filled chamber. Under the influence of an external electric field, the spheres can be caused to rotate in accordance with their electrostatic anisotropy to provide a display in accordance with their optical anisotropy.

Another form of electronic ink is disclosed in U.S. Pat. Nos. 5,389,945, 6,017,584 and 6,120,588, the contents of which are incorporated herein by reference. The disclosed electronic inks include a plurality of particles of one color dispersed within a fluid of another color. Under the influence of an external electric field, the particles can be displaced within the fluid towards or away from the surface to provide a display. Colored displays are provided by using electrostatically graded particles of different colors, and more complex electric field control.

A first embodiment of the present invention will now be described with reference to FIGS. 7, 8, 9 and 10. The pen, generally designated by reference numeral 101, includes a housing 102 in the form of a plastics molding having walls 103 defining an interior space 104 for mounting the pen components. The pen top 105 is in operation rotatably mounted at one end 106 of the housing 102. A semi-transparent cover 107 is secured to the opposite end 108 of the housing 102. The cover 107 is also of molded plastics, and is formed from semi-transparent material in order to enable the user to view the status of the LED mounted within the housing 102 (see later). The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 11 3A on the cover 107 are arranged to receive a metal end piece 114, including corresponding screw threads 115. The metal end piece 114 is removable to enable ink cartridge replacement.

Also mounted within the cover 107 is a tri-color status LED 11 6 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

(1) Stylus 120 nib 121 out.
(2) Ink cartridge 118 nib 119 out.
(3) Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto location tags printed in infrared ink (see later). An image sensor 132 is provided mounted on the second flex PCB 129 for receiving reflected radiation from the surface. The second flex PCB 129 also mounts a radio frequency chip 133, which includes a RF transmitter and RF receiver, and a controller chip 134 for controlling operation of the pen 101. An optics block 135 (formed from molded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

The pen of this embodiment of the invention is specifically arranged to detect coded data recorded on a surface for use in sending instructions to a computing system. Such coded data includes location tags printed on the surface in infrared ink. Each location tag includes printed region data which identifies a first identity in the form of the region in which the tag is printed (e.g. if the tag is printed on a sheet of paper this data will identify the sheet of paper) and also location data identifying a second identity in the form of the location of the tag within the region. The location tags also include target structures which enable calculation of three-dimensional orientation of the pen relative to the surface on which the tag is printed (e.g. tilt with respect to the surface). The tag may also contain various control data.

The pen 101 is arranged to determine the position of the image sensor 32 and thereby of its nib (stylus nib 121 or ink cartridge nib 119) by imaging, in the infrared spectrum, an area of the surface in the vicinity of the nib. It records the location data from the nearest location tag, and is arranged to calculate the distance of the image sensor 32 and thereby of the nib 121 or 119 from the location tag utilising optics 135 and controller chip 134. The controller chip 134 calculates the orientation of the pen and the nib-to-tag distance from the perspective distortion observed on the imaged tag.

Control data from the location tag may include control bits instructing the pen 101 to activate its "active area" LED (this is in fact one mode of the tri-color LED 116, which becomes yellow when the pen determines, from the control data, that the area that is being imaged is an "active area"). Thus, a region on the surface which corresponds to the active area of a button or hyperlink may be encoded to activate this LED, giving the user of the pen visual feedback that the button or hyperlink is active when the pen 101 passes over it. Control data may also instruct the pen 101 to capture continuous pen force readings. Thus a region on the surface which corresponds to a signature input area can be encoded to capture continuous pen 101 force.

Pen 101 action relative to the surface may comprise a series of strokes. A stroke consists of a sequence of time-stamped pen 101 positions on the surface, initiated by pen-down event and completed by a subsequent pen-up event. Note that pen force can be interpreted relative to a threshold to indicate whether the pen is "up" or "down", as well as being interpreted as a continuous value, for example when the pen is capturing a signature. The sequence of captured strokes will be referred to hereinafter as "digital ink". Digital ink can be used with a computing system to form the basis for the digital exchange of drawings and handwriting, for on-line recognition of handwriting, and for on-line verification of signatures.

Utilizing the RF chip 133 and antenna 112 the pen 101 can transmit the digital ink data (which is encrypted for security and packaged for efficient transmission) to the computing system.

When the pen is in range of a receiver, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

The pen 101 also includes a state changing device in the form of an electric field generator, the state changing device serving to change the state of electronic ink of the surface as the pen 101 moves relative to the surface. The electric field generator may be activated, wherein a change of state of the electronic ink by the state changing device occurs, or deactivated, wherein a change of state by the state changing device does not occur, by any suitable sensing means, for example by a force sensor. The force sensor may be arranged to activate or deactivate the electric field generator when the relative force between the apparatus and the surface exceeds a predetermined value. The force sensor may be the same as or separate to the optical sensor for detecting pen up and pen down conditions and/or the degree of force applied to the surface by the user as discussed above.

Enablement of the electric field generator may be controlled by applying enablement or disablement markers to the surface. In order for the electric field generator to be enabled or disabled, the electric field generator must be activated. The markers may be detected by the detection means of the pen and used to enable or disable the electric field generator. Enablement may alternatively be controlled by the computing system with which the pen is communicating, and may be based on a description of the surface, or region of the surface, with which the pen is interacting, identified from the region ID sensed by the pen from the location tags on the surface and communicated to the computing system.

When enabled, the electric field generator is allowed to change the state of electronic ink printed on the surface and when disabled, the electric field generator is not allowed to change the state of electronic ink printed on the surface.

The enablement and disablement markers may be incorporated into the location tags as a series of bits, with the bits representing a map of the area occupied by the tag and each bit indicating whether an area or sub-area is available for modification or not. Alternatively, the enablement and disablement markers may be separate to the location tags. Alternatively also, as alluded to above, enablement and disablement information may be part of a surface description (e.g. a page description) maintained by the computing system.

In this way, specific regions on the surface may be marked so as to designate markable, non-markable, erasable or non-erasable regions of the surface.

The electric field generator may be located at one longitudinal end of the pen and may be arranged to have two operational modes, i.e. one mode to change the state of the electronic ink to a first state (i.e. "marked"), and a second mode of the electric field generator serves for example to change the state of the electronic ink to a second state (i.e. "blank" or "erased").

Figure 13:
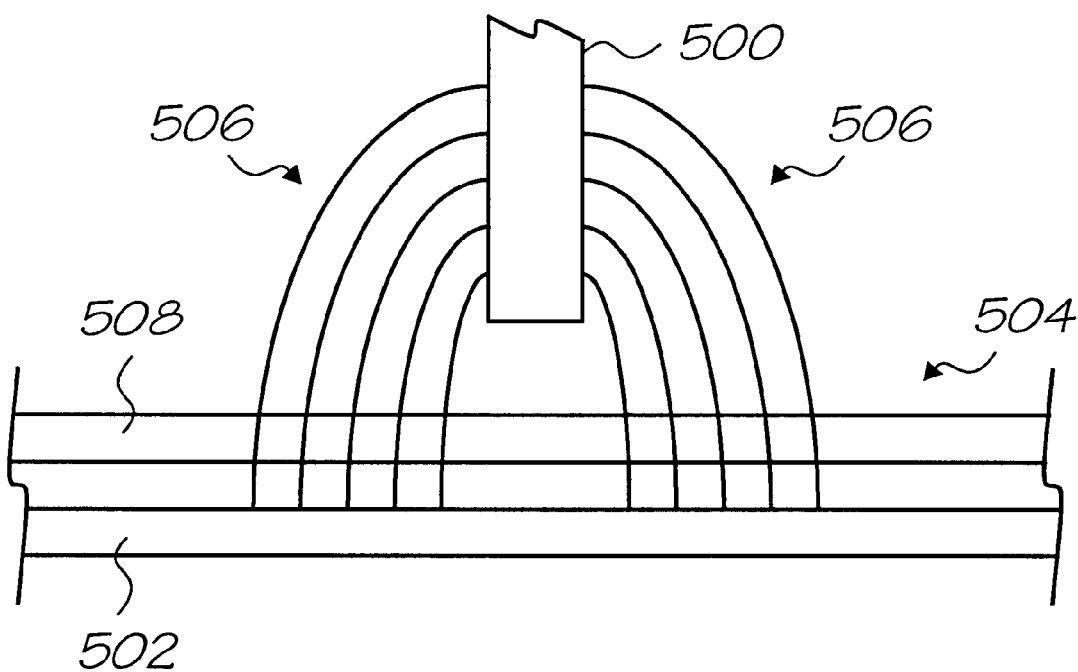
FIG. 13 is a schematic view of an electric field between an electrode and a sheet medium.

The electric field generator may include one or more electrodes, of the same or opposite polarities. In one configuration, shown in FIG. 13, an electrode 500 within the pen interacts with a conductive layer 502 of the surface medium 504 to produce an electric field 506 oriented substantially at right angles to the surface. The field serves to align electronic ink particles in the electronic ink layer 508 with the field, thus controlling the visual appearance of the electronic ink and hence the surface. In marking mode the electrode switched to one polarity relative to the conductive substrate, while in erasing mode the electrode is switched to the opposite polarity. In an alternative configuration, electrodes of opposite polarities are arranged in the pen to generate an electric field which penetrates into the surface, and whose intensity is stronger in the desired direction than in the opposite direction.

An electrode may be incorporated into the end piece 114, the cover 107, or the stylus nib 121.

In an alternative embodiment, marking and erasing electric field generators may be located at opposite longitudinal ends of the pen. With this arrangement, of course, a tag sensor would be required at each end of the pen.

Information can be applied to the surface by printing on the surface both electronic ink dots, which may or may not be invisible to the human eye when printed on the surface, and permanent ink dots such as pigment-based colored ink dots or dye-based ink dots. Whereas the electronic ink dots can be made modifiable as described above, the permanent ink dots remain un-modifiable. This allows markings made by a user on the surface by changing the state of the electronic ink to be modifiable without affecting un-modifiable pre-printed information.

The various operations of the pen will now be described in more detail in the following sections.

Figure 9:
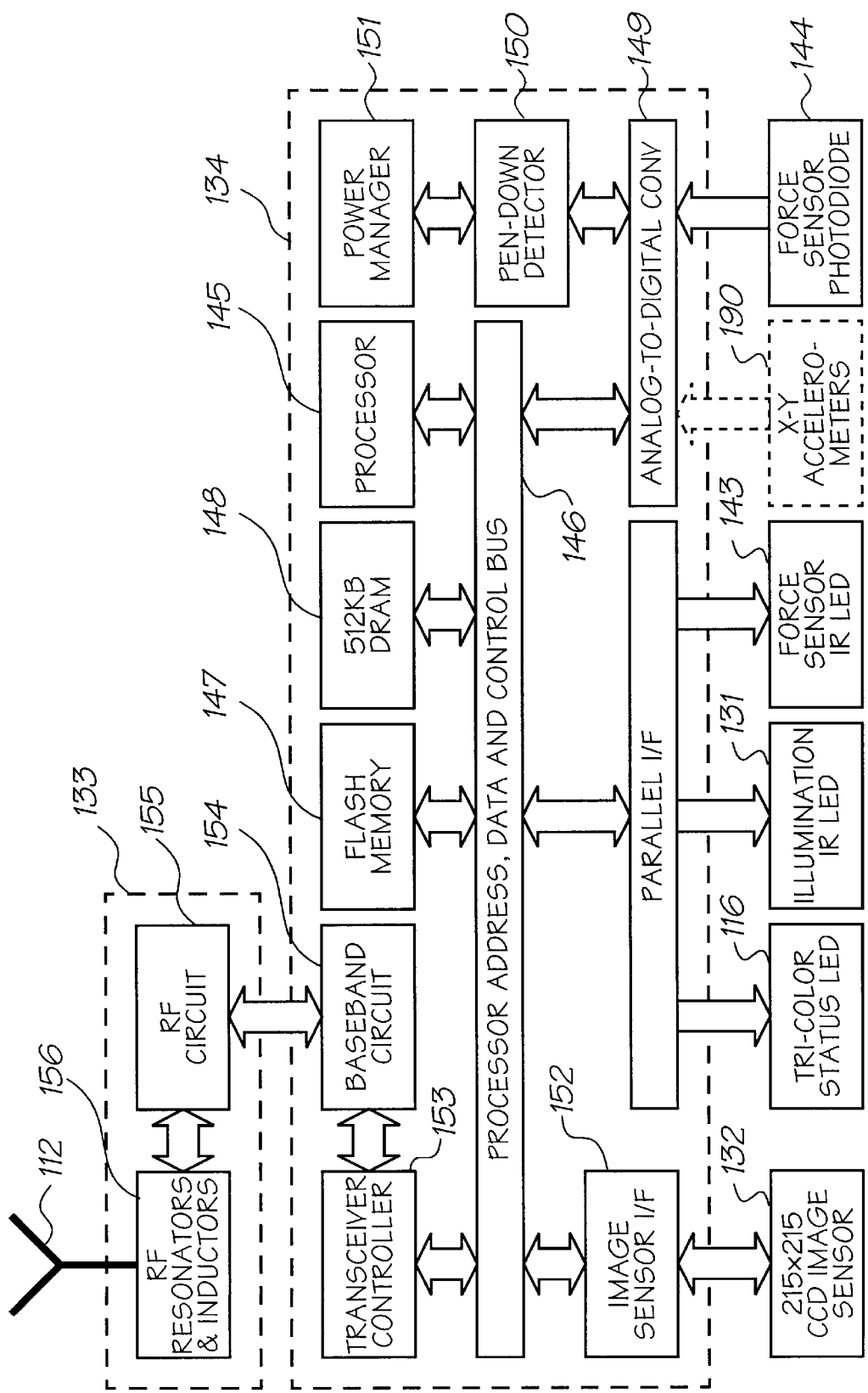
FIG. 9 is a schematic block diagram of a pen controller for the netpage pen shown in FIGS. 7 and 8.

As discussed above, the controller chip 134 is mounted on the second flex PCB 129 in the pen 101. FIG. 9 is a block diagram illustrating in more detail the architecture of the controller chip 134. FIG. 9 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is CCD with an approximate resolution of 215×215 pixels (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

As discussed above, the pen 101 optics is implemented by a moulded optics body 135. The optics that is implemented by the optics body 135 is illustrated schematically in FIG. 10. The optics comprises a first lens 157 for focussing radiation from the infrared LED 131, a mirror 158, a beam splitter 159, an objective lens 160 and a second lens 161 for focusing an image onto image sensor 132. Axial rays 162 illustrate the optical path.

The optical path is designed to deliver a sharp image to the image sensor 132 of that part 193 of the imaged surface which intersects the field of view cone 192, within required tilt ranges. The primary focussing element is the objective lens 160. This is also used in reverse to project illumination from the IR illumination LED 131 onto the surface within the field of view. Since it is impractical to place both the image sensor 132 and the IR LED 131 at the focus of the objective, a beam splitter 159 is used to split the path and separate relay lenses 157 and 161 in each path provides refocussing at the image sensor 132 and the IR LED 131 respectively. This also allows different apertures to be imposed on the two paths.

The edges of the image sensor 132 act as the field stop for the capture field, and the capture path is designed so that the resulting object space angular field of view is as required (i.e. just under 20° for the application of this embodiment—see later). The illumination path is designed to produce the same object space field of view as the capture path, so that the illumination fills the object space field of view with maximum power and uniformity.

The IR LED 131 is strobed in synchrony with frame capture. The use of focussed illumination allows both a short exposure time and a small aperture. The short exposure time prevents motion blur, thus allowing position tag data capture during pen movement. The small aperture allows sufficient depth of field for the full range of surface depths induced by tilt. The capture path includes an explicit aperture stop for this purpose.

Because the image sensor 132 has a strong response throughout the visible and near infrared part of the spectrum, it is preceded by an infrared filter 163 in the capture path so that it captures a clean image of the tag data on the surface, free from interference from other graphics on the surface which may be printed using inks which are transparent in the near infrared.

When the stylus nib 121 or ink cartridge nib 119 of the pen 101 is in contact with a surface, the pen 101 determines its position and orientation relative to the surface at 100 Hz to allow accurate handwriting recognition (see the article by Tappert, C, C Y Suen and T Wakahara, "The State of the Art in On-Line Hand Writing Recognition" IEEE Transactions on Pattern Analysis and Machine Intelligence, Vol 12, number 8, August 1990, the disclosure of which is incorporated herein by reference). The force sensor photodiode 144 is utilized to indicate relative threshold whether the pen is "up" or "down". The force may also be captured as a continuous value, as discussed above, to allow the full dynamics of a signature to be verified.

The pen 101 determines the position and orientation of its nib 119, 121 on the surface by imaging, in the infrared spectrum, an area of the surface in the vicinity of the nib 119, 121. It decodes the nearest tag data and computes the position of the nib 119, 121 relative to the location tag from the observed perspective distortion on the imaged tag and the known geometry of the pen optics 135. Although the position resolution of the tag may be low, the adjusted position resolution is quite high, and easily exceeds the 200 dpi resolution required for accurate handwriting recognition (see above reference).

Pen 101 actions relative to a surface are captured as a series of strokes. A stroke consists of a sequence of time-stamped pen positions on the surface, initiated by a pen-down event and completed by the subsequent pen-up event. A stroke is also tagged with the region id of the surface whenever the region id changes, i.e. just at the start of the stroke under normal circumstances. As discussed above, each location tag includes data indicative of its position on the surface and also region data indicative of the region of the surface within which the tag lies.

The pen also senses and decodes any markers which may be present on the surface and in response to sensing the makers causes the electric field generator to enable marking of the surface or erasing of marks from the surface, or to disable marking and erasing, whichever is appropriate.

Figure 11:
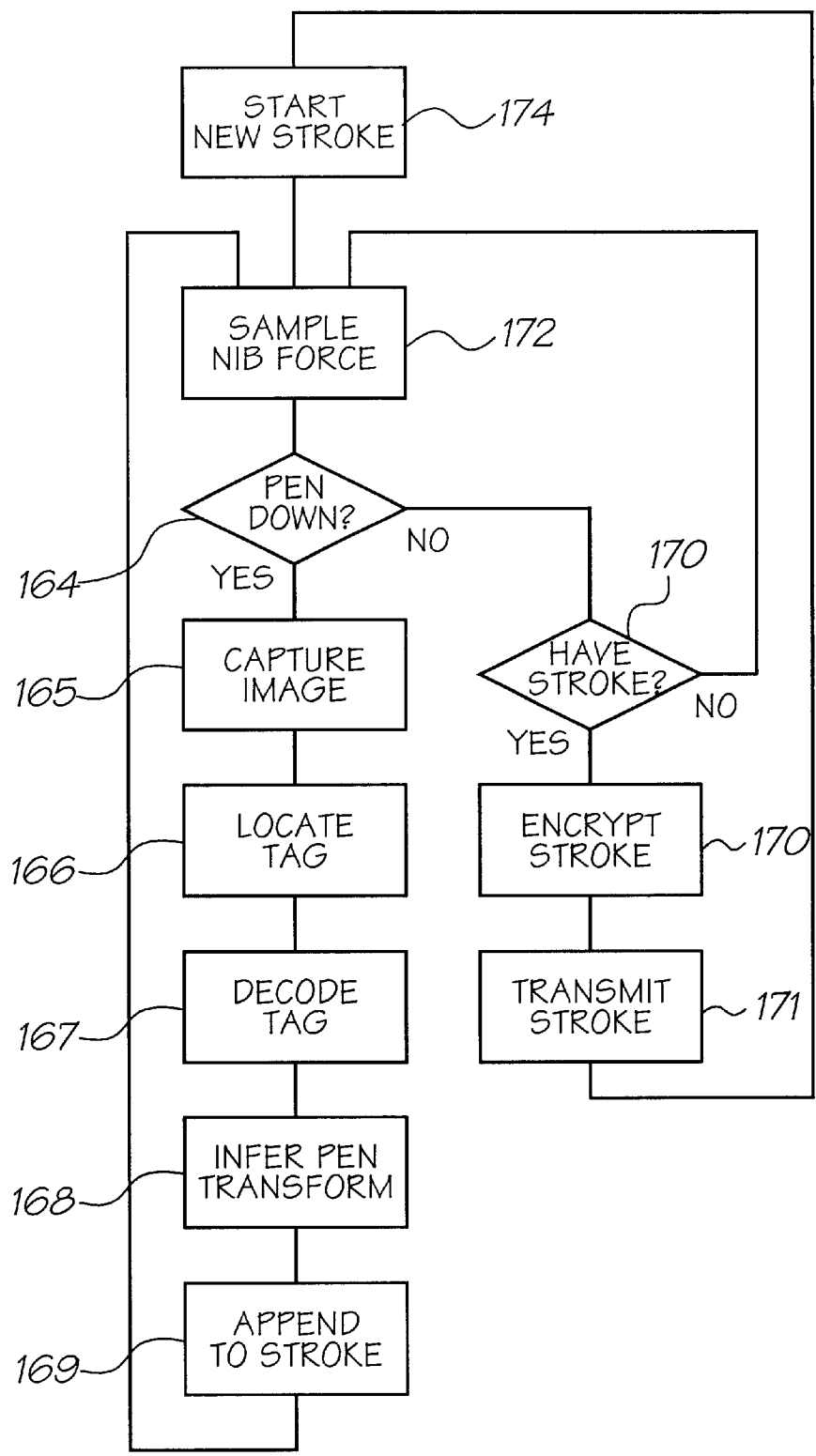
FIG. 11 is a flowchart of a stroke capture algorithm.

FIG. 11 is a diagram illustrating location tag and stroke processing in the pen 101. When the pen 101 is in the pen-up state, the pen controller 134 continuously monitors the force sensor photodiode 144 for a pen-down condition (step 164). While the pen is in a pen-down state, the pen controller 134 continuously captures 165, 166 and decodes 167 tag data from location tags from the surface, infers the pen 101 position and orientation relative to the surface, 168 and appends the position data to the current stroke data (including the tag data and other information such as force, if it is being continuously monitored). On a pen-up event the pen controller 134 encrypts 170 the stroke data and transmits 171 the stroke data via the RF chip 133 and antenna 112, to the computing system. Note that the pen samples the nib force 172 in order to determine whether the stroke has been completed 173 and also to determine whether a new stroke is being started 174.

Assuming a reasonably fast 8 bit multiply (3 cycles), the processing algorithm uses about 80% of the processor's time when the pen is active.

If the pen is out of range of a computing system to transmit to, then it buffers digital ink in its internal memory. It transmits any buffered digital ink when it is next within range of a computing system. When the pen's internal memory is full the pen ceases to capture digital ink and instead flashes its error LED whenever the user attempts to write with the pen 101.

Figure 12:
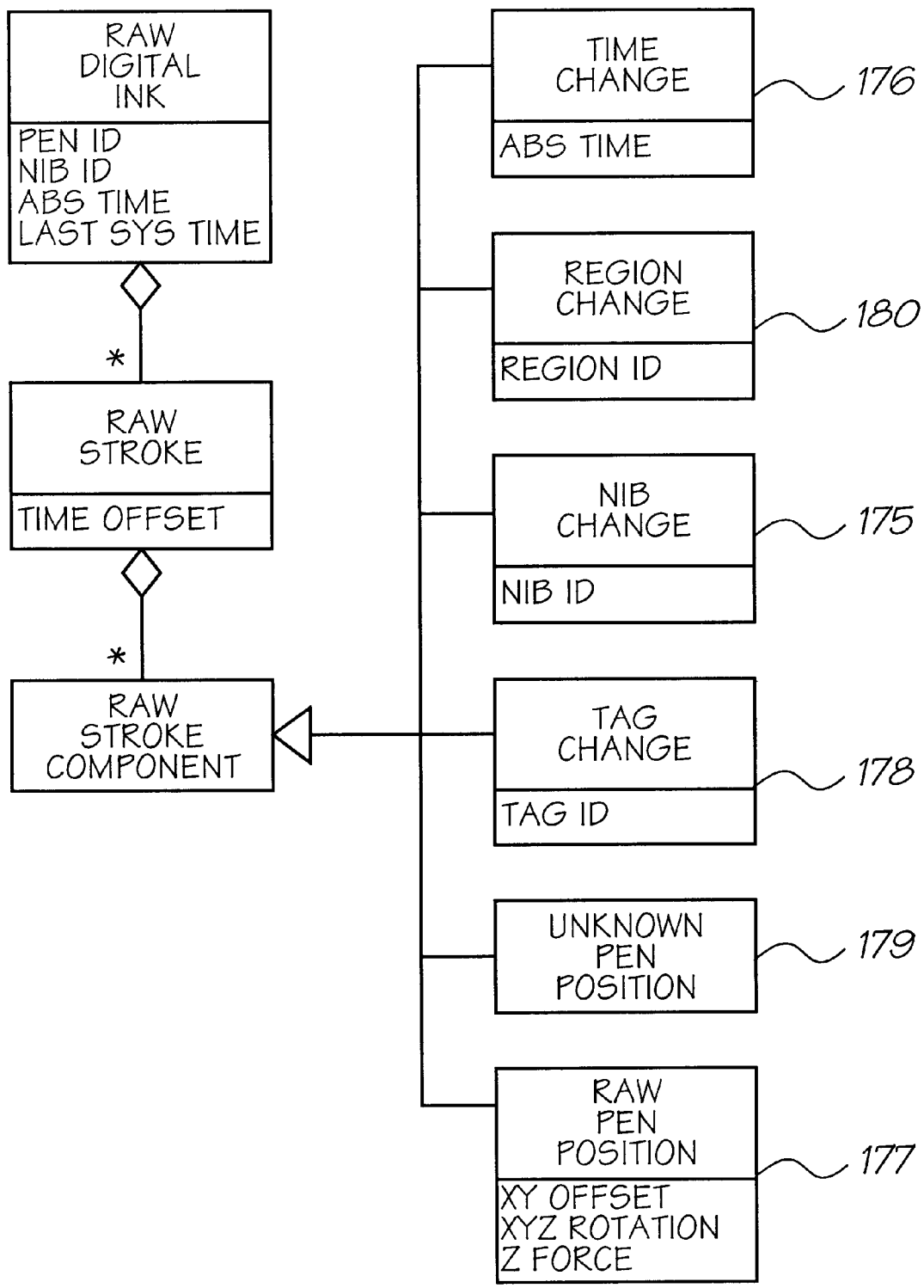
FIG. 12 is a schematic view of a raw digital ink class diagram.

FIG. 12 is a diagram illustrating the structure of the raw digital ink transmitted from the pen 101 to the computing system. Digital ink which is buffered in the pen 101 when the pen 101 is working offline is stored in the same form as digital ink which is transmitted to the system.

When the pen 101 connects to the computing system, the controller 134 notifies the system of the pen id, nib id 175, current absolute time 176, and the last absolute time it obtained from the system prior to going offline. This allows the system to compute any drift in the pen's clock and timeshift any digital ink received from the pen 101 accordingly. The pen 101 then synchronizes its real-time clock with the accurate real-time clock of the system. The pen id allows the computing system to identify the pen when there is more than one pen being operated with the computing system. Pen id may be important in systems which use the pen to identify an owner of the pen, for example, and interact with that owner in a particular directed manner. In other embodiments this may not be required. The nib id allows the computing system to identify which nib, stylus nib 121 or ink cartridge nib 119, is presently being used. The computing system can vary its operation depending upon which nib is being used. For example, if the ink cartridge nib 119 is being used the computing system may defer producing feedback output because immediate feedback is provided by the ink markings made on the surface. Where the stylus nib 121 is being used, the computing system may produce immediate feedback output.

At the start of a stroke the pen controller 134 records the elapsed time since the last absolute time notified to the system. For each pen 101 position 177, in the stroke the controller 134 records the x and y offset of the pen nib 119, 121 from the current tag, the x, y and z rotation of the pen 101, and the nib force. It only records the tag id 178 (data identifying tag location) if it has changed. Since the tag frequency is significantly smaller than the typical position sampling frequency, the tag id is constant for many consecutive pen 101 positions, and may be constant for the entire stroke if the stroke is short.

Since the pen 101 samples its positions and orientation at 100 Hz, pen 101 positions in a stroke are implicitly clocked at 100 Hz and do not need an explicit timestamp. If the pen 101 fails to compute a pen 101 position, e.g. because it fails to decode a tag, it must still record a pen 101 position to preserve the implicit clocking. It therefore records the position as unknown, 179 allowing the computing system to later interpolate the position from adjacent samples if necessary.

Since the 32-bit time offset of a stroke has a finite range (i.e. 49.7 days), the pen 101 optionally records an absolute time 176 for a stroke. This becomes the absolute time relative to which later strokes' time offsets are measured.

Since the region id is constant for many consecutive strokes, the pen only records the region id when it changes 180. This becomes the region id implicitly associated with later pen positions.

Since a user may change the nib 119, 121 between one stroke and the next, the pen 101 optionally records a nib id for a stroke 175. This becomes the nib id implicitly associated with later strokes.

Each component of a stroke has an entropy-coded prefix. A 10 mm stroke of 1 second duration spans two or three tags, contains 100 positions samples, and therefore has a size of about 5500 bits. Online continuous digital ink capture therefore requires a maximum transmission speed of 5.5 Kbps, and offline continuous digital ink capture requires about 40 Kbytes of buffer memory per minute. The pen's 512 KB DRAM 48 can therefore hold over 12 minutes of continuous digital ink. Time, region and nib changes happen so infrequently that they have a negligible effect on the required transmission speed and buffer memory. Additional compression of pen 101 positions can reduce transmission speed and buffer memory requirements further.

Each raw stroke is encrypted using the Triple-DES algorithm (see Schneier, B, Applied Cryptography, Second Edition, Wiley 1996, the disclosure of which is incorporated herein by reference) before being transmitted to the computing system. The pen and computing system exchange session keys for this purpose on a regular basis. Based on a conservative estimate of 50 cycles per encrypted bit, the encryption of a one-second 5500 bit stroke consumes 0.7% of the processor's 45 time.

In a first alternative embodiment, the coded data is indicative of an identity which is data identifying the substrate. This enables the pen 101 to identify the substrate, such as whether the substrate is a particular type of document or whether the substrate forms part of another object. Of course, since with this embodiment the tags are indicative of the characteristics of the surface and not the location of the tags relative to the surface, separate means are required for sensing movement of the apparatus relative to the surface.

In a second alternative embodiment, the coded data is indicative of an identity which is data indicative of the tag type. The pen 101 can then identify whether the tag represents an object of interest rather than a position on the surface. For example, if the tag represents an object and corresponds to a user interface input element (e.g. a command button), then the tag can directly identify the input element.

Figure 10:
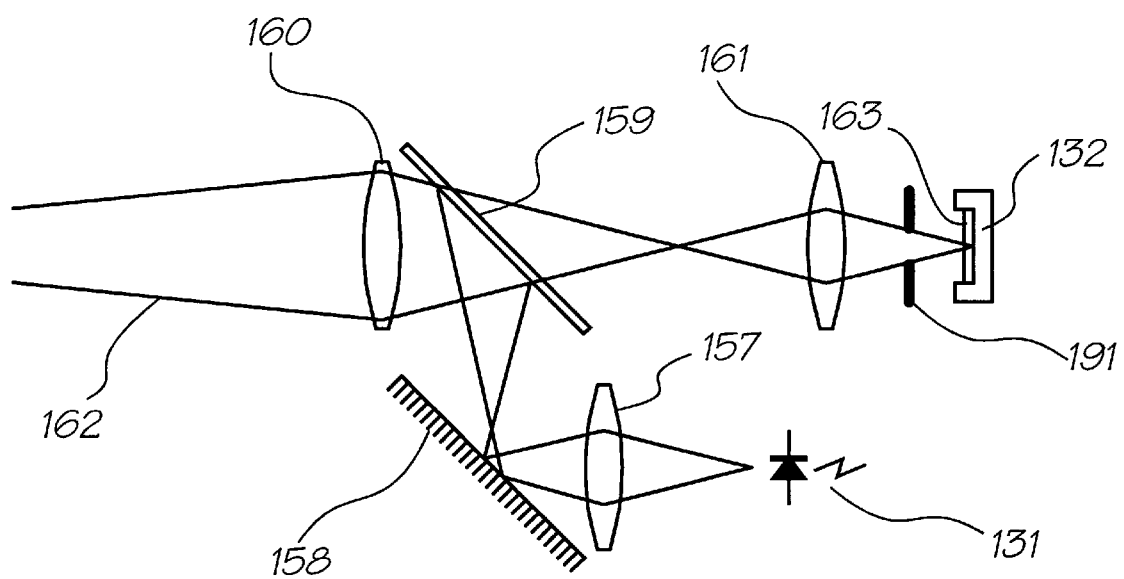
FIG. 10 is a schematic view of a pen optical path.

A suitable separate movement sensing means for use with the alternative embodiments includes a pair of orthogonal accelerometers 190 mounted in a plane normal to the pen 101 axis. The accelerometers 190 are shown in FIGS. 10 and 9 in ghost outline.

The provision of the accelerometers enables this embodiment of the pen 101 to sense motion without reference to surface tags, allowing the tags to be sampled at a lower rate.

The acceleration measured by the accelerometers in each of the X and Y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate is short.

Instead of providing accelerometers to sense motion relative to the surface, alternative motion sensing means may be provided. Such means include motion sensing means which includes an optical sensor which cooperates with the surface to generate signals indicative of movement of the optical sensor relative to the surface, motion sensing means which includes at least two contacts arranged to contact the surface and sense movement in two orthogonal directions, or any other suitable motion sensing means for sensing movement relative to a surface.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

What is claimed is:

1. A sensing device for use with a surface having coded data and electronic ink disposed on he surface, the coded data being indicative of an identity of a region associated with the surface, the sensing device including:
    an image sensor adapted to optically sense at least some of the coded data when placed in an operative position relative to the surface;
    a region identity generator configured to generate region identity data indicative of the identity of the region using at least some of the optically sensed coded data; and
    a transmitter configured to transmit the region identity data to a computer system.

2. A sensing device as claimed in claim 1, further including a motion sensor configured to generate movement data indicative of movement of the sensing device relative to the region.

3. A sensing device as claimed in claim 2, wherein the motion sensor is configured to generate the movement data using at least some of the optically sensed coded data.

4. A sensing device as claimed in claim 3, wherein the coded data is indicative of a plurality of reference points of the region, the motion sensor being configured to generate the movement data as the sensing device moves relative to at least one of the reference points.

5. A sensing device as claimed in claim 3, wherein the coded data includes periodic elements, the motion sensor being configured to generate the movement data as the sensing device moves relative to at least one of the periodic elements.

6. A sensing device as claimed in claim 4, wherein the motion sensor is configured to sample the position of the sensing device relative to the at least one reference point, thereby to generate the movement data.

7. A sensing device as claimed in claim 5, wherein the motion sensor is configured to sample the position of the sensing device relative to the at least one periodic element, thereby to generate the movement data.

8. A sensing device as claimed in claim 2, wherein the motion sensor includes at least one acceleration sensor, the acceleration sensor being configured to sense acceleration of the sensing device as the sensing device moves relative to the surface region, the motion sensor being configured to generate the movement data by periodically sapling the acceleration.

9. A sensing device as claimed in claim 8, wherein the acceleration sensor is configured to sense at least two substantially orthogonal components of acceleration.

10. A sensing device as claimed in claim 1, wherein the state changing device is activatable and deactivatable.

11. A sensing device as claimed in claim 10, further including a force sensor adapted to activate the state changing device when the relative force between the apparatus and the surface exceeds a predetermined value.

12. A sensing device as claimed in claim 10, further including a detector responsive to a marker associated with the surface to enable or disable the state changing device in response to detection of the marker.

13. A sensing device as claimed in claim 12, wherein the coded data includes a plurality of tags, each tag being indicative of an identity of a region within which the tag lies, and each tag including a marker.

14. A sensing device as claimed in claim 1, wherein the state changing device includes an electric field generator.

15. A sensing device as claimed in claim 4, wherein the coded data includes a plurality of tags, each tag being indicative of an identity of a region within which the tag lies, and each tag being indicative of a reference point of the region, the region being associated with the surface, and the reference point being indicative of the position of the tag relative to the region.

16. A sensing device as claimed in claim 5, wherein the coded data includes a plurality of tags, each tag being indicative of an identity of a region within which the tag lies, and each tag including at least one periodic element.

17. A system for capturing information applied freehand, said system including a sensing device as claimed in claim 1, and a surface having electronic ink associated with the surface and coded data associated with the surface.

18. A system as claimed in claim 17, wherein said surface is provided with electronic ink and color visible ink which is not electronic ink.

19. A substrate for use with a sensing device as claimed in claim 1, the substrate including a surface having electronic ink associated with the surface and coded data associated with the surface, the coded data being indicative of an identity of a region associated with the surface.

20. A sensing device for use with a surface having coded data and electronic ink disposed on the surface, the coded data being indicative of an identity of a region associated with the surface, the sensing device including:

a region identity generator configured to generate region identity data indicative of the identity of the region using the coded data;

a transmitter configured to transmit the region identity data to a computer system; and a state changing device for changing the state of the electronic ink.

21. A sensing device as claimed in claim 20, wherein the state changing device includes a first state changing devise for changing the state of the electronic ink to a first state and a second state changing device for changing the state of the electronic ink to a second state.

22. A sensing device as claimed in claim 21, wherein the apparatus is elongate, the first state changing device is disposed adjacent a first longitudinal end of the apparatus and the second state changing device is disposed adjacent a second opposite longitudinal end of the apparatus.

23. A sensing device as claimed in claim 20, further including a motion sensor configured to generate movement data indicative of movement of the sensing devise relative to the region.

24. A sensing device as claimed in claim 23, wherein the motion sensor is configured to generate the movement data using the coded data.

25. A sensing device as claimed in claim 24, wherein the coded data is indicative of plurality of reference points of the region, the motion sensor being configured to generate the movement data as the sensing device moves relative to at least one of the reference points.

26. A sensing device as claimed in claim 24, wherein the coded data includes periodic elements, the motion sensor being configured to generate the movement data as the sensing device moves relative to at least one of periodic elements.

27. A sensing device as claimed in claim 25, wherein the motion sensor is configured to sample the position of the sensing device relative to the at least one reference point, thereby to generate the movement data.

28. A sensing device as claimed in claim 26, wherein the motion sensor is configured to sample the position of the sensing device relative to the at least one periodic element, thereby to generate the movement data.

29. A sensing device as claimed in claim 23, wherein the motion sensor includes at least one acceleration sensor, the acceleration sensor being configured to sense acceleration of the sensing device as the sensing device moves relative to the surface region the motion sensor being configured to generate the movement data by periodically sampling the acceleration.

30. A sensing device as claimed in claim 29, wherein the acceleration sensor is configured to sense at least two substantially orthogonal components of acceleration.

31. A sensing device as claimed in claim 20, wherein the state changing device is activatable and deactivatable.

32. A sensing device as claimed in claim 31, further including a force sensor adapted to activate the state changing device when the relative force between the apparatus and the surface exceeds a predetermined value.

33. A sensing device as claimed in claim 31, further including a detector responsive to a marker associated with the surface to enable or disable the state changing device in response to detection of the marker.

34. A sensing device as claimed in claim 33, wherein the coded data includes a plurality of tags, each tag being indicative of an identity of a region within which the tag lies, and each tag including a marker.

35. A sensing device as claimed in claim 20, wherein the state changing device includes an electric field generator.

36. A sensing device as claimed in claim 25, wherein the coded data includes a plurality of tags, each tag being indicative of an identity of a region within which the tag lies, and each tag being indicative of a reference point of the region, the region being associated with the surface, and the reference point being indicative of the position of the tag relative to the region.

37. A sensing device as claimed in claim 26, wherein the coded data includes a plurality of tags, each tag being indicative of an identify of a region within which the tag lies, and each tag including at least one periodic element.

38. A system for capturing information applied freehand, said system including a sensing device as claimed in claim 20, and a surface having electronic ink associated with the surface and coded data associated with the surface.

39. A system as claimed in claim 38, wherein said surface is provided with electronic ink and color visible ink which is not electronic ink.

40. A substrate for use with a sensing device as claimed in claim 20, the substrate including a surface having electronic ink associated with the surface and coded data associated with the surface, the coded data being indicative of an identity of a region associated with the surface.

* * * * *